United States Patent [19]

Akita et al.

[11] 4,361,796
[45] Nov. 30, 1982

[54] VOLTAGE CONTROL SYSTEM FOR VEHICLES

[75] Inventors: Yoshio Akita, Ichinomiya; Katsumi Itoh, Ohbu; Katsuya Muto, Kariya; Katsutaro Iwaki, Chiryu; Takeshi Nakamoto, Ohbu, all of Japan

[73] Assignee: Nippondenso Co., Ltd., Kariya, Japan

[21] Appl. No.: 190,254

[22] Filed: Sep. 24, 1980

[30] Foreign Application Priority Data

Sep. 27, 1979 [JP] Japan ................. 54-125120

[51] Int. Cl.$^3$ .............. H02J 7/14; H02J 7/24
[52] U.S. Cl. ................. 322/99; 320/64; 322/28
[58] Field of Search .......... 320/61, 64, 68, 48; 322/28, 59, 60, 72, 73, 99, 26

[56] References Cited

U.S. PATENT DOCUMENTS 4,141,613  2/1979  Mori et al. ............... 320/64 X
4,306,184  12/1981  Iwaki ....................... 320/64 X Primary Examiner—R. J. Hickey
Attorney, Agent, or Firm—Cushman, Darby & Cushman

[57] ABSTRACT

A voltage control system for vehicles includes a power supply control circuit which allows power to be supplied to a voltage regulator circuit from a battery through a voltage detection line only when a key switch is turned on. The voltage regulator circuit controls the energization of a generator depending on the terminal voltage of the battery detected through the voltage detection line. The power supply control circuit includes a voltage divider circuit for detecting a voltage developed at an output terminal of an auxiliary rectifier associated with the generator when the connection of the output terminal to the battery is completed upon closing the key switch. The power supply control circuit also includes an output transistor controlled by the voltage detected by the voltage divider circuit and when the detected voltage reaches a predetermined level, the output transistor is rendered conductive and allows the supply of power from the battery to the voltage regulator circuit through the voltage detection line.

7 Claims, 5 Drawing Figures

VOLTAGE CONTROL SYSTEM FOR VEHICLES

BACKGROUND OF THE INVENTION

The present invention relates to a voltage control system for vehicles, which is capable of controlling the generation of power of an AC generator installed in a vehicle and also giving a warning that the power generation is not normal or faulty.

A known voltage control system of the above type is shown in FIG. 1 of the accompanying drawings. In the case of this system, a voltage regulator circuit 200 includes a path comprising a resistor 208 and a diode 209 so that when a break occurs in a charging line $l_1$ or a voltage detection line $l_2$, the power generation control is accomplished in accordance with the voltage generated from an auxiliary rectifier 4, thus preventing the generator from becoming uncontrolled. Also an energizing resistor 71 is connected to an "L" terminal so that when the power generation is stopped due to a break in the energizing circuit, a lamp 9 is turned on through the resistor 71 to give a warning.

However, this system is disadvantageous in that while the generator can be prevented from becoming uncontrolled upon occurrence of a break in the charging line $l_1$ or the voltage detection line $l_2$, it is impossible to indicate the occurrence of such fault and particularly in the case of a break in the charging line $l_1$ the driver cannot become aware of the break until the battery runs down. There is another disadvantage in that the voltage regulator circuit 200 is supplied with power from the auxiliary rectifier 4 so that due to the presence of the break detecting resistor 71, during the initial excitation period or when the power generation is faulty, the voltage at the "L" terminal decreases considerably as compared with the battery voltage with the resulting decrease in the supply voltage to the voltage regulator circuit 200, thereby causing in certain circumstances the operation of its circuit component (an output transistor 201 in this case) to become unstable.

SUMMARY OF THE INVENTION

It is the object of the present invention to provide a voltage control system for vehicles which overcomes the foregoing deficiencies in the prior art.

Thus, the improved voltage control system provided in accordance with the invention features in that instead of supplying power to the voltage regulator circuit from the auxiliary rectifier through the "L" terminal, upon closing the key switch the voltage regulator circuit is supplied through the "S" terminal from the voltage detection line for detecting the battery voltage.

DESCRIPTION OF THE PREFERRED EMBODIMENT

The present invention will now be described in greater detail with reference to the illustrated embodiment.

Figure 2:
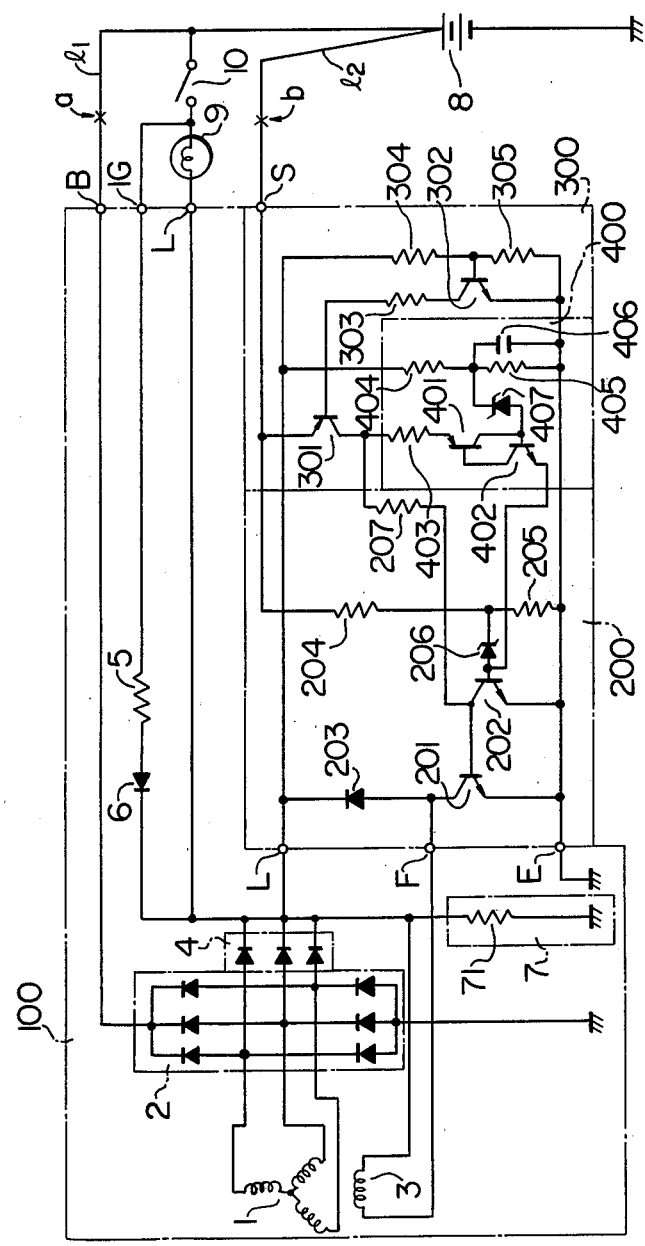
FIG. 2 is a circuit diagram showing an embodiment of the present invention.

Referring to FIG. 2, there is illustrated the overall construction of a voltage control system in accordance with an embodiment of the invention. In the Figure, numeral 100 designates a three-phase AC generator which is driven by a vehicle engine with a voltage control circuit means built into a part of it. Numeral 1 designates armature coils, 2 a main full-wave rectifier, 3 a field coil, 4 an auxiliary rectifier, 5 a resistor for initial excitation, 6 a reverse current blocking diode, and 7 a warning circuit for operating an indicating lamp 9 when the generation of power is stopped due to a break failure in the excitation circuit or a break failure in a charging line $l_1$ or a voltage detection line $l_2$. The warning circuit 7 comprises a resistor 71 having a low resistance value (e.g., about 10 ohms). Numeral 8 designates a vehicle battery, 9 the generation indicating lamp, and 10 a key switch (usually the ignition switch). Numeral 200 designates a voltage regulator circuit comprising a power transistor 201 which may be two transistor connected in a Darlington configuration and a control transistor 202, a counterelectromotive force absorbing diode 203, resistors 204 and 205 for detecting the battery voltage applied through an "S" terminal, a Zener diode 206, and a resistor 207 for supplying an output transistor driving power. Numeral 300 designates a power supply control circuit comprising a transistor 301 for supplying the power from the battery 8 through the voltage detection line $l_2$ and the "S" terminal, a control transistor 302 for controlling the operation of the transistor 301, a resistor 303, and resistors 304 and 305 for detecting the output voltage at an "L" terminal. Numeral 400 designates an overvoltage detecting circuit comprising transistors 401 and 402 forming a hold circuit, a resistor 403, resistors 404 and 405 for detecting an abnormally high voltage generated at the "L" terminal, a smoothing capacitor 406 and a Zener diode 407.

With the construction described above, the operation of the embodiment is as follows. Firstly, when the key switch 10 is open, no voltage appears at the "L" terminal so that the transistor 303 is turned off and the output transistor 301 is turned off and thus no power is supplied to the circuits 400 and 200. At this time, since the resistance value of the battery voltage detecting resistors 204 and 205 is sufficiently high, the battery discharge current flowing through the resistors 204 and 205 is very small and the current flowing to the circuits is minimized.

Then, when the key switch 10 is closed, a current flows from the battery 8 through the key switch 10, the lamp 9 or the resistor 5 and the diode 6, and the energizing resistor 71, and the lamp 9 is turned on. When the current flows further so that a voltage is generated at the "L" terminal, the control transistor 302 is turned on and the output transistor 301 is turned on, thus turning on the output transistor 201 in the voltage regulator circuit 200. As a result, an excitation current flows from the "L" terminal by way of the field coil 3 and the output transistor 201. In this case, though the resistor 71 and the field coil 3 are connected in parallel between the "L" terminal and the ground so that the output voltage at the "L" terminal is decreased further, the base current of the output transistor 201 is supplied through the "S" terminal, thus always ensuring its stable operation.

When the engine is started thus starting the generation of power, the auxiliary rectifier 4 generates an output voltage and the voltage at the "L" terminal becomes equal to the generated voltage. Thus, the lamp 9 is turned off and the transistors 301 and 302 of the power supply control circuit 300 are always held in the ON state. As a result, the transistors 201 and 202 of the voltage regulator circuit 200 are turned on and off in accordance with the battery voltage from the "S" terminal so that the excitation condition of the generator is controlled and the terminal voltage of the battery 8 is regulated at a fixed value (e.g., about 14 volts) which is determined by the resistors 204 and 205 and the Zener diode 206.

Next, the operation of the system will be described with reference to a case where there is a fault or trouble in any part of the generating unit. Firstly, when there is a break failure in the charging line $l_1$ (e.g., the disconnection of a "B" terminal), the generator momentarily generates a high voltage so that the Zener diode 407 of the overvoltage detecting circuit 400 is momentarily turned on and the transistors 401 and 402 forming the hold circuit are turned on. As a result, the control transistor 202 of the voltage regulator circuit 200 is forcibly turned off and the power generation is stopped. In this case, when the power generation is stopped, the voltage at the "L" terminal is decreased so that the current flows from the battery 8 through the lamp 9 and the resistor 71 and the lamp 9 is turned on, thus alerting the driver to the fault.

On the other hand, when a break failure (e.g., the disconnection of the "S" terminal) occurs in the voltage detection line $l_2$, no power is supplied to the voltage regulator circuit 200 so that the output transistor 201 is automatically turned off and the power generation is stopped. In this case, the lamp 9 is turned on as previously.

When a break (e.g., the disconnection of an "F" terminal) occurs in the excitation circuit, the power generation is stopped instantaneously so that the lamp 9 is similarly turned on and the driver is alerted to the fault.

It will be seen that in accordance with the present invention, when the generator produces an abnormally high voltage or a break occurs in any of the input and output lines, etc., the power generation is rapidly stopped and simultaneously the driver is alerted to the fault by means of the generation indicating lamp 9.

Figure 1:
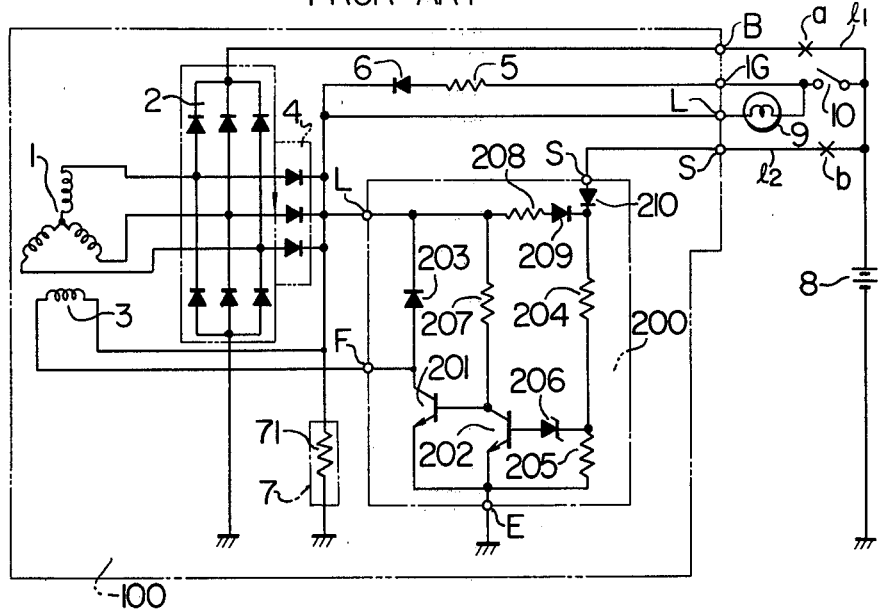
FIG. 1 is a circuit diagram showing a prior art voltage control system.
Figure 3:
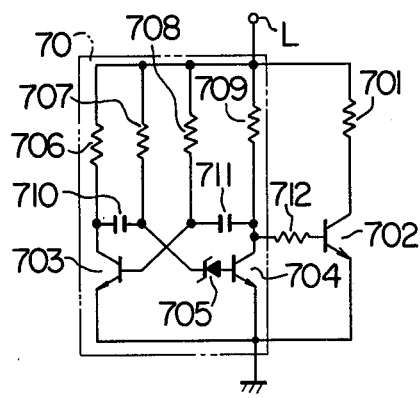
FIG. 3 is a circuit diagram showing another embodiment of the warning circuit shown in FIG. 2.

Referring to FIG. 3, there is illustrated another embodiment of the warning circuit 7. In the Figure, numeral 70 designates an oscillator circuit comprising an astable multivibrator, and a drive transistor 702 is turned on and off in accordance with the oscillation output of the oscillator circuit 70, thereby intermittently connecting an energizing resistor 701 to the "L" terminal. The oscillator circuit 70 comprises transistors 703 and 704, a Zener diode 705, resistors 706 to 709 and capacitors 710 and 711. The Zener voltage of the Zener diode 705 is cleverly selected so that the Zener diode 705 is turned on only when the power is generated normally (when a voltage of about 14 volts is usually generated at the "L" terminal), thus causing the oscillator circuit 70 to oscillate. On the other hand, the oscillator circuit 70 is stopped from oscillating when the generator is not generating or when the power generation is stopped.

In this way, when the generator is not generating or when the power generation is stopped due to a fault in the generator or the like, the transistor 704 of the oscillator circuit 70 is turned off and the drive transistor 702 is turned on, thus causing the lamp 9 to go on. On the other hand, when the generator is generating normally, the oscillator circuit 70 is oscillated so that the drive transistor 702 is turned on and off intermittently and the power consumption of the resistor 701 having a small resistance value is decreased as far as possible. In this case, the generated voltage appears at the "L" terminal and consequently the lamp 9 remains off irrespective of the turning on and off of the drive transistor 702.

The inventors have confirmed by experiments that while the power consumption is about 20 W or over when the value of the energizing resistor of FIG. 2 is about 10 ohms, by using the oscillator circuit 70 shown in FIG. 3 and by selecting the ON-time duty cycle of the drive transistor 702 to be 1/50 to 1/100, the power consumption of the energizing resistor 701 can be reduced to about 0.2 to 0.3 W during the period of normal power generation and to less than about 2 to 3 W during the non-generating period, thus satisfactorily reducing the power capacity of the resistor 701 and thereby reducing the size of the system.

Figure 4:
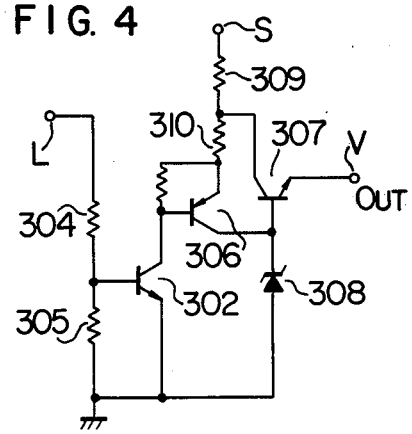
FIG. 4 is a circuit diagram showing another embodiment of the power supply control circuit shown in FIG. 2.

Referring next to FIG. 4, there is illustrated another embodiment of the power supply control circuit 300 shown in FIG. 2. In the Figure, numeral 302 and 306 designate control transistors, 307 an output transistor, 308 a Zener diode, 309 an output resistor, and 310 a resistor. These circuit elements form a constant voltage circuit. With this circuit, when an output voltage appears at the "L" terminal, the transistor 302 is turned on and the output transistor 307 always supplies a fixed voltage $V_{out}$ to the circuits 200 and 400.

While, in the embodiment described above, the operation of the power supply control circuit 300 is controlled in accordance with the output voltage appearing at the "L" terminal, this circuit may be replaced with any other circuit provided that it comes into operation only when the key switch 10 is closed and its control signal may also be comprised of the signal generated from the terminal of the key switch 10 which is remote from the battery or a signal generated by any other means for sensing the closing of the key switch.

Further, while in the embodiment described above, the supply voltage from the "S" terminal is supplied to both the voltage regulator circuit 200 and the overvoltage detecting circuit 400, it is possible to arrange that the supply voltage is supplied to the voltage regulator circuit 200 alone and the other circuit 400 is supplied with the generated voltage.

Figure 5:
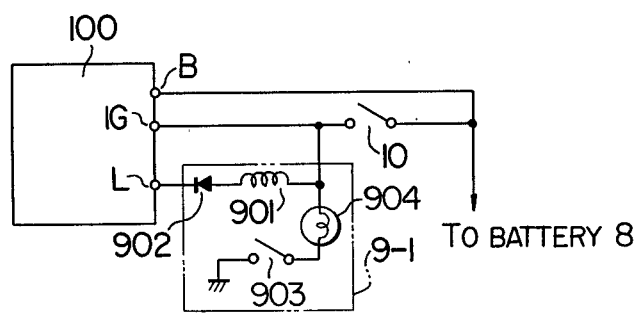
FIG. 5 is a circuit diagram showing another embodiment of the indicator means shown in FIG. 2.

Further, while in the above-described embodiment, the lamp 9 itself is directly connected between the "L" terminal and the key switch 10 to form indicator means, it is possible to use the construction shown in FIG. 5 in which a relay coil 901 and a reverse current blocking diode 902 are connected between the "L" terminal and the key switch 10, whereby a lamp 904 is operated by relay contacts 903 which are energized by the relay coil 901.

It will thus be seen from the foregoing description that the system of this invention has among its great advantages the fact that it includes a power supply control circuit adapted to control such that power is supplied to a voltage regulator circuit from a battery through a voltage detection line only when a key switch is closed, with the result that the flow of the discharge current from the battery through the voltage detection line is prevented as far as possible when the key switch is not closed, that when the key switch is closed the voltage regulator circuit is allowed to operate stably without being influenced by the output voltage of an auxiliary rectifier of the generator, and that the generator is automatically stopped when a break occurs in the voltage detection line.

Another great advantage is that the generator auxiliary rectifier has its output terminal connected to the battery through indicator means and the key switch with warning means connected to this rectifier output terminal such that the indicator means is operated when the generator stops generating, whereby the indicator means is also allowed to serve the function of giving a warning when the generator stops generating due to a break failure in the voltage detection line or the excitation circuit.

We claim:

1. A voltage control system for vehicles comprising:
   an AC generator installed in a vehicle;
   main rectifier means having an output terminal;
   auxiliary rectifier means having an output terminal;
   a key switch;
   indicator means;
   a charging and a voltage detecting line;
   a battery connected to said output terminal of said main rectifier means through said charging line and to said output terminal of said auxiliary rectifier means through said indicator means and said key switch;
   a voltage regulator circuit disposed to detect a terminal voltage of said battery through said voltage detection line such that energization of said generator is controlled in accordance with said terminal voltage;
   a power supply control circuit disposed to supply power to said voltage regulator circuit through said voltage detection line only when said key switch is closed; and
   warning means connected to the output terminal of said auxiliary rectifier means to operate said indicator means when said AC generator is not generating.

2. A voltage control system according to claim 1 further comprising over-voltage detecting means connected to the output terminal of said auxiliary rectifier means to cause said voltage regulator circuit to stop generation of electric power from said generator when an overvoltage is detected.

3. A voltage control system according to claim 2 wherein said over-voltage detecting means comprises:
   a voltage divider circuit connected to the output terminal of said auxiliary rectifier means,
   a smoothing capacitor connected to a junction point of said voltage divider circuit,
   a Zener diode having one end connected to the junction point of said voltage divider circuit and being adapted to become conductive when a voltage at the junction point exceeds a predetermined voltage level, and
   a transistor having a base connected to the other end of said Zener diode and having a collector-emitter circuit connected to said power supply control circuit, said transistor being rendered conductive upon conduction of said Zener diode to provide a signal to said voltage regulator circuit to effect stopping of the generation of the electric power by said generator.

4. A voltage control system according to claim 1 wherein said warning means comprises:
   a series circuit of a resistor and a transistor connected to the output terminal of said auxiliary rectifier means, and
   an oscillator circuit having an output connected to the base of said transistor thereby to render said transistor conductive intermittently.

5. A voltage control system according to claim 1 wherein said power supply control circuit comprises:
   a series circuit of two resistors connected to the output terminal of said auxiliary rectifier for detecting a voltage developed thereat,
   an output transistor connected to said voltage detection line for supplying the power to said voltage regulator circuit, and
   a control transistor having a base connected to the junction point of said two resistors and having a collector-emitter circuit connected to the base of said output transistor for rendering said output transistor conductive when a predetermined voltage level is detected by said series circuit of two resistors.

6. A voltage control system according to claim 1 wherein said power supply control circuit comprises:
   a series circuit of two resistors connected to the output terminal of said auxiliary rectifier for detecting a voltage developed thereat,
   a Zener diode;
   an output transistor having a collector-emitter circuit connected to said voltage detection line and having a base connected to said Zener diode for supplying the power of a constant voltage determined by said Zener diode to said voltage regulator circuit, and
   a control transistor having a base connected to the junction point of said two resistors and having a collector-emitter circuit connected to a junction point between the base of said output transistor and said Zener diode.

7. A voltage control system for vehicles having a key switch, an AC generator and a battery, said control system comprising:
   main rectifier means having an output terminal;
   auxiliary rectifier means having an output terminal;
   indicator means;
   a charging line connecting said output terminal of said main rectifier means to said battery, said battery further being connected to said output terminal of said auxiliary rectifier means through said indicator means and said key switch;
   a voltage detection line;
   a voltage regulator circuit disposed to detect a terminal voltage of said battery through said voltage detection line such that energization of said generator is controlled in accordance with said terminal voltage;
   a power supply control circuit disposed to supply power to said voltage regulator circuit through said voltage detection line only when said key switch is closed; and
   warning means connected to the output terminal of said auxiliary rectifier means to operate said indicator means when said AC generator is not generating.

* * * * *